US011981589B2

(12) United States Patent
Bosi et al.

(10) Patent No.: US 11,981,589 B2
(45) Date of Patent: May 14, 2024

(54) DEVICE FOR SLUDGE TREATMENT

(71) Applicants: X2 SOLUTIONS S.R.L., Mirandola (IT); POLITECNICO DI MILANO, Milan (IT)

(72) Inventors: Vittorio Bosi, Mirandola (IT); Emanuele De Risio, Mirandola (IT); Roberto Canziani, Mirandola (IT); Gonzalo Garcìa Fuentes, Mirandola (IT); Simone Visigalli, Mirandola (IT); Giuseppe Di Florio, Mirandola (IT)

(73) Assignees: X2 SOLUTIONS S.R.L, Mirandola (IT); POLITECNICO DI MILANO, Milan (IT)

( * ) Notice: Subject to any disclaimer, the term of this patent is extended or adjusted under 35 U.S.C. 154(b) by 656 days.

(21) Appl. No.: 16/757,832

(22) PCT Filed: Oct. 26, 2018

(86) PCT No.: PCT/IB2018/058392
§ 371 (c)(1),
(2) Date: Apr. 21, 2020

(87) PCT Pub. No.: WO2019/082150
PCT Pub. Date: May 2, 2019

(65) Prior Publication Data
US 2021/0188682 A1 Jun. 24, 2021

(30) Foreign Application Priority Data
Oct. 26, 2017 (IT) .......................... 102017000122179

(51) Int. Cl.
*C02F 11/00* (2006.01)
*B30B 9/12* (2006.01)
(Continued)

(52) U.S. Cl.
CPC ............ *C02F 11/006* (2013.01); *B30B 9/121* (2013.01); *B30B 9/128* (2013.01); *C02F 11/125* (2013.01);
(Continued)

(58) Field of Classification Search
None
See application file for complete search history.

(56) References Cited

U.S. PATENT DOCUMENTS 3,506,562 A * 4/1970 Coackley ............. B01D 33/763
204/629
4,323,445 A * 4/1982 Alekhin ................ C02F 1/4696
209/913

(Continued)

FOREIGN PATENT DOCUMENTS

EP         2585778 B1    6/2014
WO   WO2008/029961 A1   3/2008

*Primary Examiner* — Benjamin M Kurtz
(74) *Attorney, Agent, or Firm* — ASLAN LAW, P.C.

(57) ABSTRACT

A device for sludge treatment comprises a supporting frame of an external casing defining a treatment chamber provided with one inlet opening of the sludge to be treated; one discharge opening of the treated sludge; at least one auger element housed within the treatment chamber, and adapted to move the sludge to be treated along a direction of advancement; and filtration means located internally to the treatment chamber and surrounding the auger element; at least one anodic element associated with the auger element, and application means for applying a potential difference between the anodic element and the filtration means, generating an electric field adapted to interact with the sludge to be treated to produce an electro-osmotic process.

14 Claims, 6 Drawing Sheets

(51) Int. Cl.
*C02F 11/125* (2019.01)
*C02F 11/15* (2019.01)
*F26B 3/34* (2006.01)
*F26B 17/18* (2006.01)

(52) U.S. Cl.
CPC ............. *C02F 11/15* (2019.01); *F26B 3/34* (2013.01); *F26B 17/18* (2013.01); *C02F 2303/06* (2013.01)

(56) References Cited

U.S. PATENT DOCUMENTS

| | | |
|---|---|---|
| 5,403,455 A | 4/1995 | Candor |
| 2012/0255872 A1 | 10/2012 | Smith et al. |
| 2013/0098765 A1* | 4/2013 | Stradi .................... B30B 9/163 |
| | | 204/627 |

* cited by examiner

DEVICE FOR SLUDGE TREATMENT

CROSS-REFERENCE TO RELATED APPLICATIONS

This application is a National Stage Entry of PCT/IB2018/058392 filed on Oct. 26, 2018. This application claims priority to IT Patent Application No. 102017000122179 filed on Oct. 26, 2017, and to PCT Application No. PCT/IB2018/058392 filed on Oct. 26, 2018, the entire contents of which are hereby incorporated by reference.

TECHNICAL FIELD

The present invention relates to a device for sludge treatment.

BACKGROUND ART

To date, the need to dispose of sludge derived from industrial and civil production is particularly felt.

These sludges may differ from one another based on their qualitative characteristics, the production process wherefrom they have been produced and the substances contained therein.

It is in fact known that the processes of water purification, agriculture, the food industry, activities related to prospecting and mining, as well as the physical or chemical treatment of the minerals related thereto, or the wood, leather and fur processing, together with the physical and mechanical surface treatment of metals and plastics, or construction and demolition operations, are among the main activities that involve a significant sludge production. In detail, such types of sludge may be: sewage sludge, olive pomace or floated material.

The sludge exhibits a liquid fraction and a solid fraction mixed together, which need to be separated such that, by depriving the sludge of its liquid fraction, the same may be subjected to further processing and transformation so that disposal thereof is facilitated.

To date, sludge treatment devices are known which comprise a supporting frame of an external casing defining a treatment chamber.

The treatment chamber comprises a motorized auger element rotatingly actuatable about a relative axis.

In addition, the devices mentioned above comprise filtration means having a cylindrical conformation and being arranged around the auger element.

According to a first type of treatment devices, the separation of the liquid fraction from the solid fraction occurs mechanically, by compacting the solid fraction.

While rotating together with the auger, the sludge reduces its volume thus releasing its liquid fraction filtered through the filtration means.

Once the liquid fraction is extracted from the sludge, and then separated from the solid fraction, it is collected in a collection chamber defined inside the treatment chamber, and arranged outside the filtration means and subsequently discharged through a corresponding discharge opening.

However, this type of known devices has numerous drawbacks, in particular due to low separation efficiency.

Added to this, is the fact that such devices need long processing times which result in significant handling costs.

To overcome at least some of the drawbacks mentioned above, devices for sludge treatment have been developed which are connected to electric power supply means in order to obtain an electric field, which is interacting with the sludge to be treated and adapted to carry out an electro-osmotic separation process.

Devices of this type are known from patent document no. EP2585778.

In particular, the document mentioned above discloses a device for sludge treatment having the auger element electrically supplied in a uniform manner so as to define an anode, with the filtration means being also electrified thereby defining a cathode.

It thus results that the liquid fraction is separated from the solid fraction by effect of a potential difference obtained inside the treatment chamber between the anode, i.e. the auger, and the cathode, i.e. the filtration means.

The sludge is subjected to a constant potential difference during its forward movement inside the treatment chamber.

However, this type of device as well has numerous drawbacks, in particular due to the fact that the potential value applied to the cathode and/or anode may not be varied.

In fact, in the presence of this type of device, the anode, which coincides with the auger element, is involved in the movement of the sludge to be treated, thereby considerably increasing deposition of sludge residues onto the auger element itself.

It will be understood easily the way how application of a constant potential value along the whole treatment chamber, in combination with the anode active involvement in the movement of the sludge to be treated, considerably accelerates the wear processes of the auger element itself, in particular in connection to the deposition of sludge residues onto the latter.

Other devices of known type are described in patent documents no. U.S. Pat. No. 5,403,455, US 2012/255872, U.S. Pat. No. 4,323,445 and WO2008/029961.

DESCRIPTION OF THE INVENTION

The main aim of the present invention is to devise a device for sludge treatment which allows considerably increasing the separation efficiency of the liquid fraction from the solid fraction compared to the devices of known type.

Within this aim, it is one object of the present invention to devise a device for sludge treatment which allows for the separation of the liquid fraction from the solid fraction by varying the potential values to which the sludge to be treated is subjected.

Another object of the present invention is to devise a device for sludge treatment, which allows overcoming the aforementioned drawbacks of the prior art within the scope of a simple, rational, easy, efficient to use and cost-effective solution.

The aforementioned objects are achieved by the present device for sludge treatment having the characteristics of claim 1.

BRIEF DESCRIPTION OF THE DRAWINGS

Other characteristics and advantages of the present invention will become more evident from the description of a preferred, but not exclusive embodiment of a device for sludge treatment, illustrated by way of an indicative, but non-limiting example, in the attached drawings in which.

EMBODIMENTS OF THE INVENTION

Figure 1:
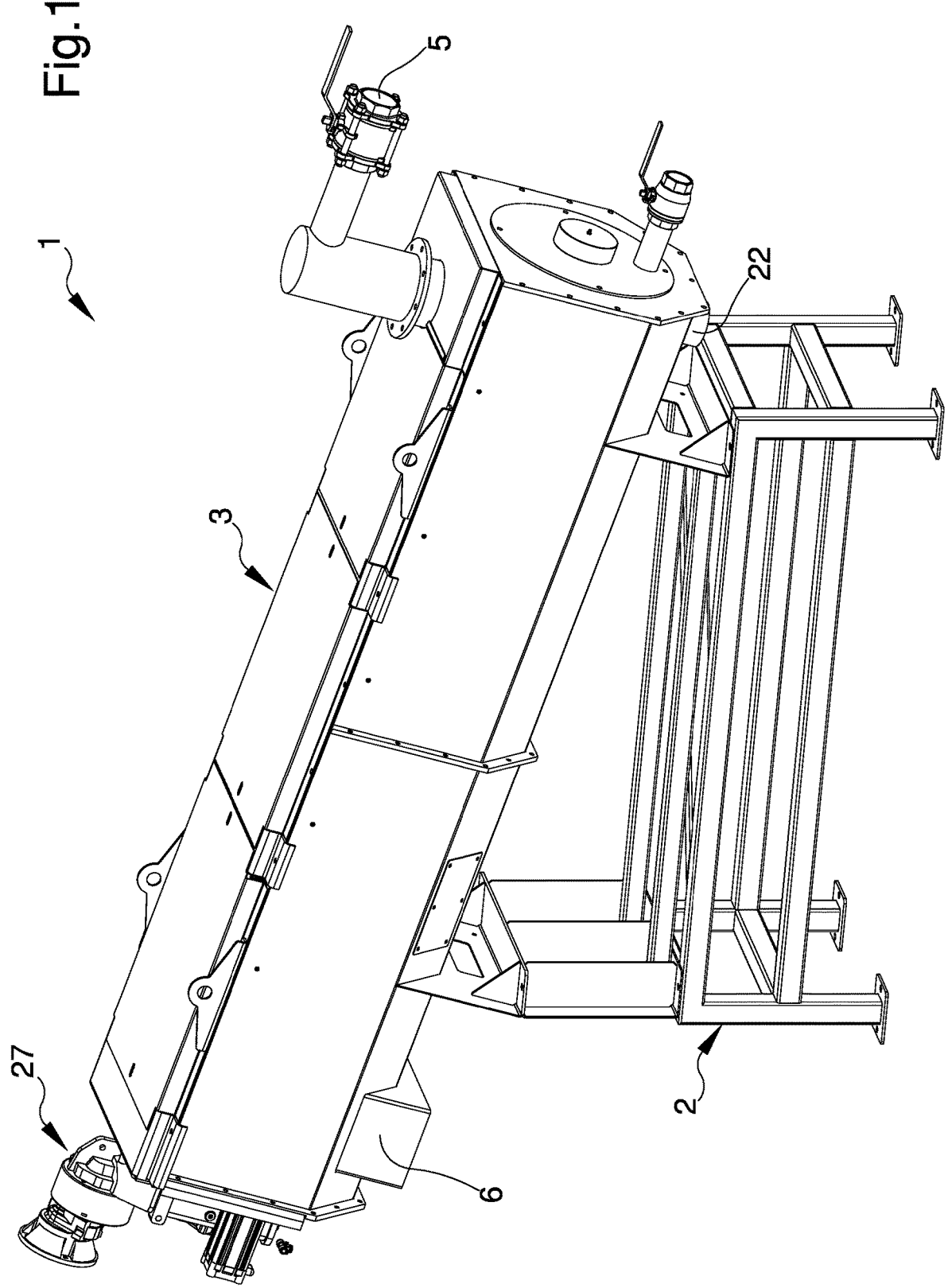
FIG. 1 is an axonometric view of the device according to the invention.
Figure 2:
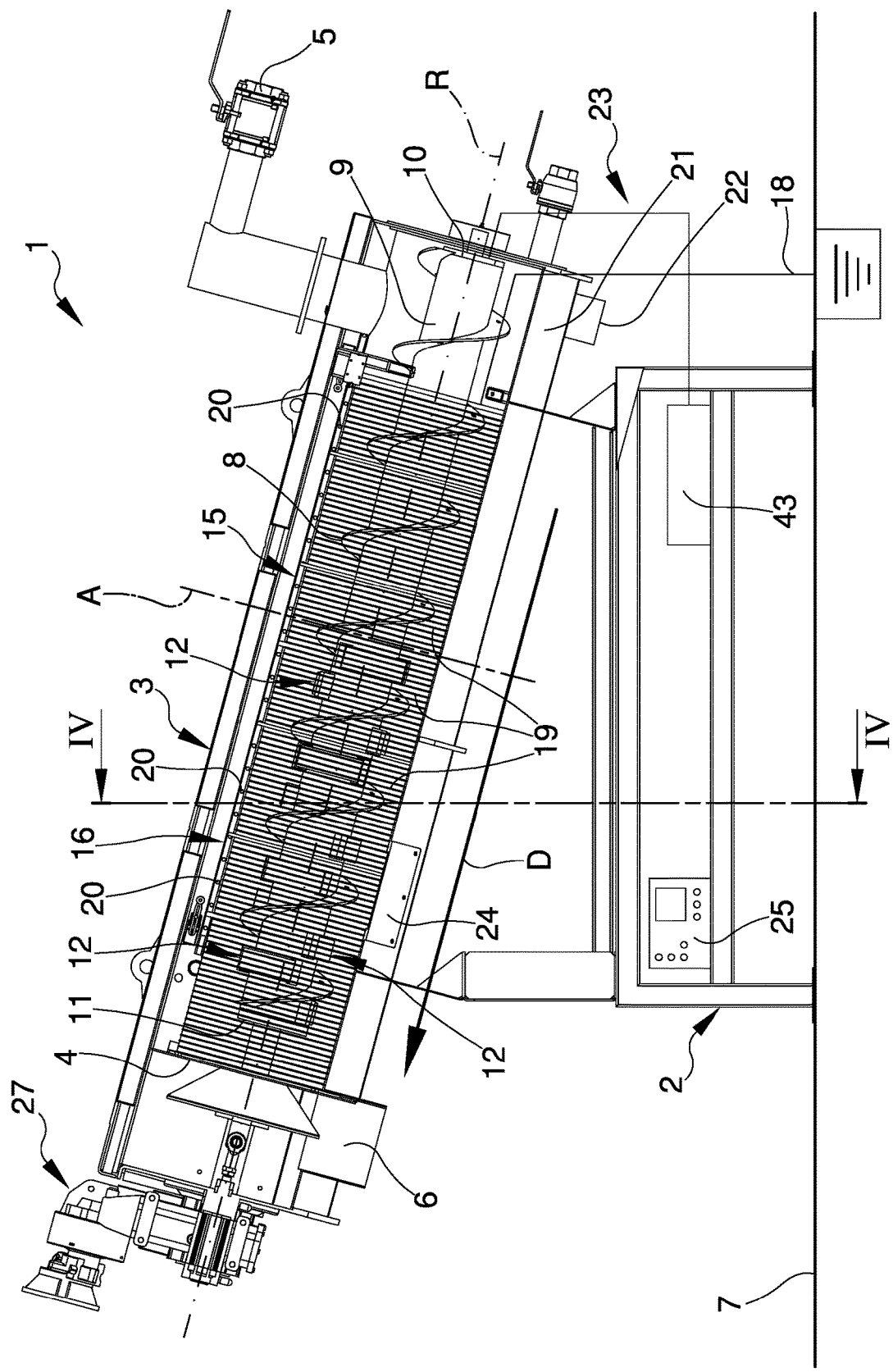
FIG. 2 is a side view in transparency of the device according to the invention.
Figure 3:
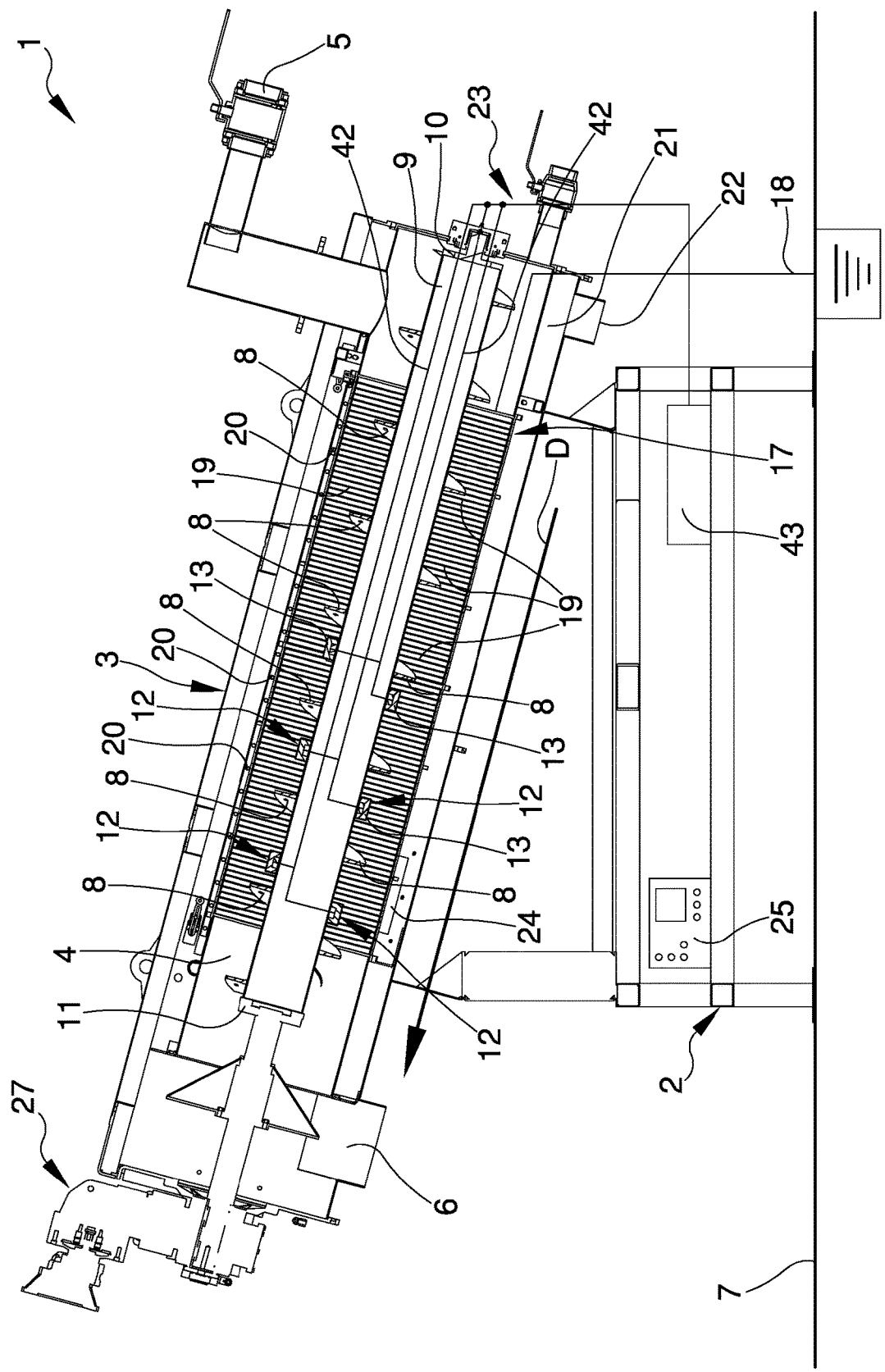
FIG. 3 is a side sectional view of the device according to the invention.
Figure 4:
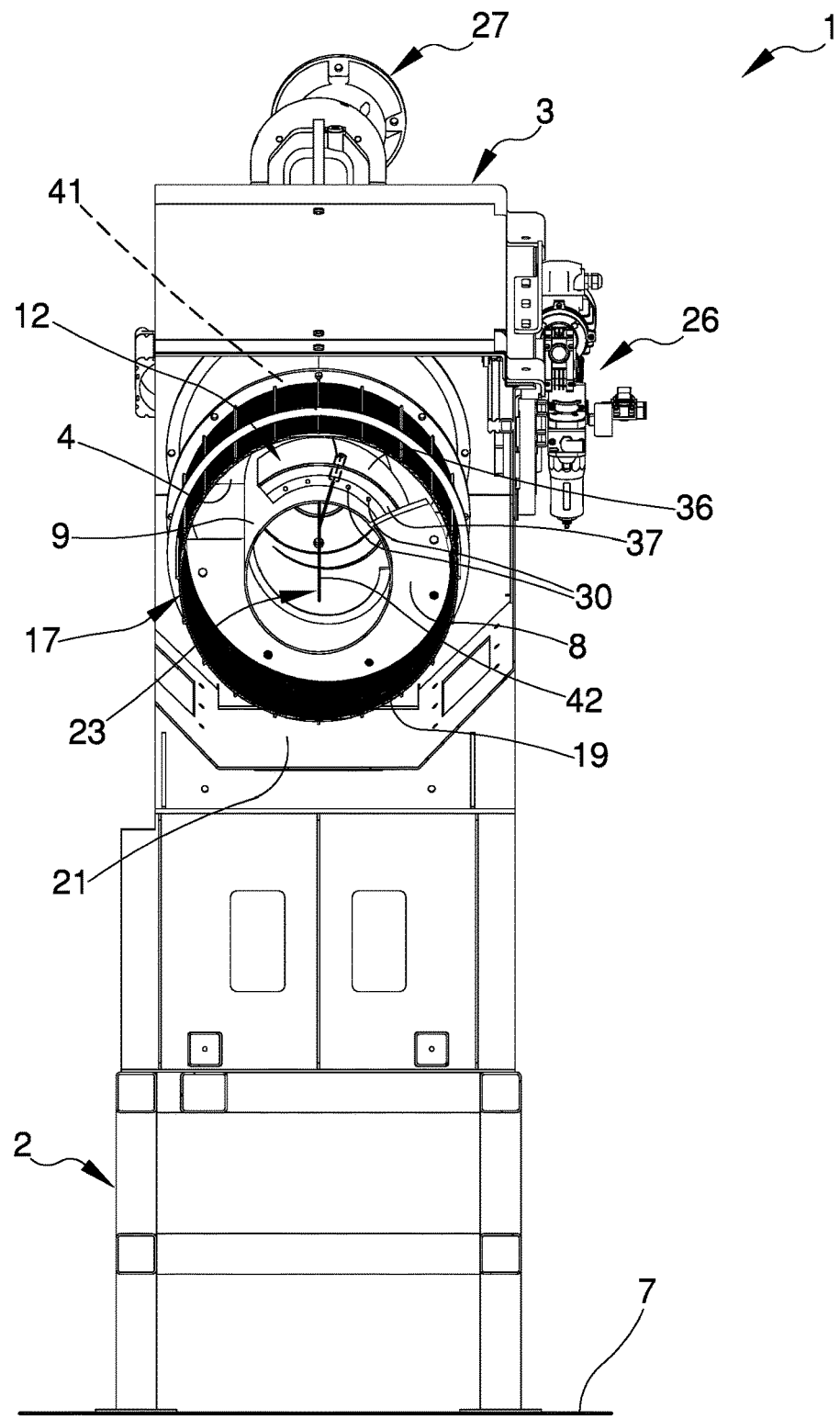
FIG. 4 is a sectional view along the plane IV of FIG. 2.
Figure 5:
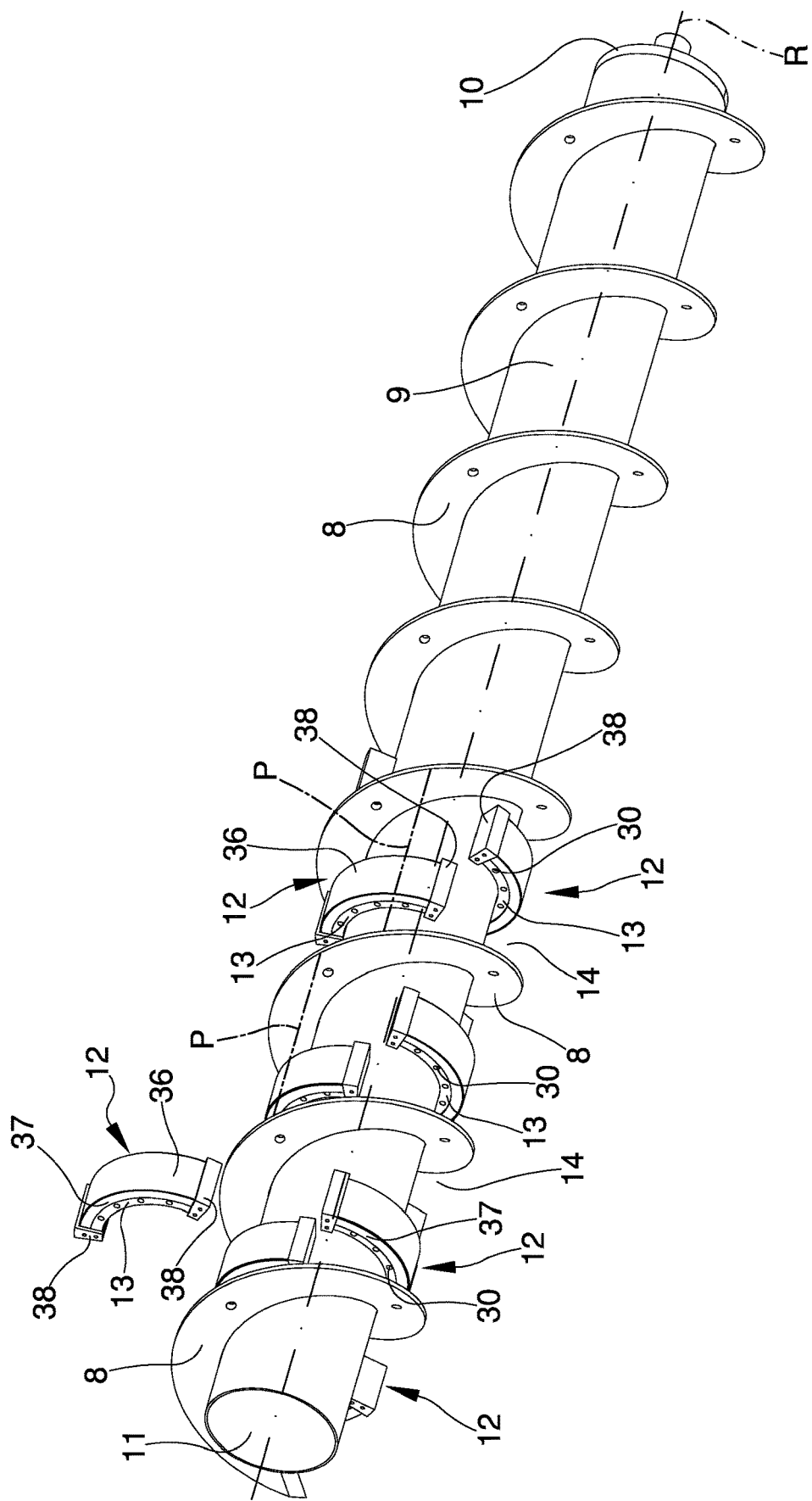
FIG. 5 is an enlarged-scale view of a detail of FIG. 2.

With particular reference to these illustrations, reference numeral 1 globally indicates a device for sludge treatment.

The device 1 comprises a supporting frame 2 of an external casing 3 defining a treatment chamber 4 provided with one inlet opening 5 of the sludge to be treated and one discharge opening 6 of the treated sludge.

The supporting frame 2 is resting on a horizontal resting surface 7 which preferably coincides with the ground.

It should be noticed that in the present discussion the term "sludge to be treated" relates to a mixture consisting of a solid material finely dispersed in a liquid and defining a suspension.

This means that the sludge to be treated comprises a liquid fraction and a solid fraction mixed together.

In addition, the term "sludge" should be understood in a collective sense with reference to sludge indiscriminately arising from agriculture, food industry, activities related to prospecting and mining, physical or chemical treatment of related minerals, wood, leather and fur processing, as well as from physical and mechanical surface treatment of metals and plastics, and from building construction and demolition operations.

The casing 3 has a substantially elongated shape in which the inlet opening 5 and the discharge opening 6 are arranged at the axial ends thereof.

The sludge to be treated is supplied continuously through the inlet opening 5.

Furthermore, the device 1 comprises one auger element 8, 9 housed within the treatment chamber 4, and adapted to move the sludge to be treated along a direction of advancement D.

The auger element 8, 9 is associated with motor means 27 adapted to operate it in rotation about a relative axis R.

The motor means 27 are of a type known to those skilled in the art, and comprise a motor member associated with a motion transmission element for transmitting motion from the motor member itself to a shaft element 9 of the auger element 8, 9.

In this regard, auger element 8, 9 comprises one helical element 8 locked together with the shaft element 9 and operable in rotation around the axis R.

Preferably, the auger element 8, 9 is operable in rotation in continuous mode.

It cannot however be ruled out that the auger element 8, 9 is operated in rotation in alternate mode.

Moreover, the helical element 8 and the shaft element 9 are coaxial to one another, the shaft element 9 is provided with a first ending part 10 located in the proximity of the inlet opening 5, and a second ending part 11 located in the proximity of the discharge opening 6.

Specifically, the axis R is substantially transverse with respect to the resting surface 7 of the supporting frame 2, in this case coinciding with the ground.

The axis R is inclined to the ground by an angle comprised between 10° and 30°.

Preferably, the axis R is inclined with respect to the ground by an angle substantially equal to 15°.

It is specified that in the context of the present discussion the term "inclined" relates to the fact that the axis R is arranged neither horizontally nor vertically.

It cannot also be ruled out that the axis R can be arranged substantially horizontally or vertically; consequently, therefore, the inclination of the treatment chamber 4 also varies.

In this regard, the auger element 8, 9 and the treatment chamber 4 are coaxial to one another.

Furthermore, the axis R is substantially parallel to the direction of advancement D.

It is worth specifying that the auger element 8, 9, in this case the shaft element 9, is electrically insulated.

For example, the shaft element 9 is made of a metallic material, of the type, e.g., of stainless steel 304 or 316.

Alternatively, the shaft element 9 is covered at least partly with an electric insulation resin.

It cannot also be ruled out that the shaft element 9 is covered with paint.

According to the invention, the device 1 comprises at least one anodic element 12 associated with the auger element 8, 9.

With reference to a preferred embodiment shown in the figures, the device 1 comprises a plurality of anodic elements 12 associated with the auger element 8, 9.

Specifically, the anodic elements 12 are associated with the shaft element 9.

Advantageously, the anodic elements 12 are substantially C shaped; this prevents the formation of incrustations on the marginal portions of the anodic elements themselves. It cannot be ruled out from the scope of the present discussion that the anodic elements 12 can be shaped differently, i.e. they can have an ellipsoidal, spherical, curvilinear shape with helical portions, or a polygonal shape such as e.g. rectangular or square. Preferably, the anodic elements 12 are at least partly made of an electrically insulating material.

Advantageously, the aforementioned insulating material is polyzene.

The anodic elements 12 comprise a front surface 35 and four lateral surfaces 31, 32, 33, 34 which are parallel and opposed to each other in twos, and at least one covering element 36 made of an electricity conductive material and associated with the front surface 35.

This conductive material is characterized by high conductivity and corrosion resistance linked to the electro-osmotic process.

Advantageously, the covering element 36 is made of MMO (Mixed Metal Oxide).

In an assembly configuration, the front surface 35 is facing outwardly relative to the shaft element 9.

Furthermore, the anodic elements 12 comprise at least two sheet-shaped elements 37 made of an electricity conductive material and associated, by covering them, with at least two of the lateral surfaces 31, 32, 33, 34.

This conductive material is a metallic or composite material.

Similarly to the covering element 36, also the sheet-shaped elements 37 are made of MMO (Mixed Metal Oxide).

In detail, each anodic element 12 is associated with the shaft element 9 by interposition of a support element 13.

Preferably, each support element 13 is made of a polymeric material.

Conveniently, the support element 13 is made of polyzene.

With reference to a preferred embodiment shown in the illustrations, the support element 13 has a housing seat 28 of an anchoring element 29 which housing seat, in the assembly configuration, faces the shaft element 9.

Preferably, the anchoring element 29 is made of a metallic material.

The anchoring element 29 can be fitted substantially to size inside the housing seat 28. In detail, the anchoring element 29 is kept in position inside the housing seat 28 by interposition of a plurality of connecting elements of the type of bolts or the like, inserted into the corresponding bolt holes 30 made on the support element 13 and on the anchoring element 29, respectively.

The bolt holes 30 of the support element 13, in the assembly configuration, mate with the respective bolt holes 30 of the anchoring element 29.

With reference to the particular embodiment shown in the figures, the lateral surfaces 31, 32, 33, 34 and the front surface 35 are made on the support element 13, and the bolt holes 30 are made on the lateral surfaces themselves.

The lateral surfaces 31, 32, 33, 34 comprise an upper lateral surface 31, a lower lateral surface 32 and two vertical lateral surfaces 33, 34 orthogonal to the latter.

In this regard, it is to be noticed that, in the present discussion, terms such as "high", "low", "upper", "lower", "above", "below" and the like are to be considered with reference to an assembly configuration wherein the direction of advancement D is a substantially ascending direction.

The covering element 36 is associated with the support element 13.

Preferably, the support element 13 and the covering element 36 have a curvilinear profile which mates with each other.

At the same time, the covering element 36 has a sheet-shaped conformation and is associated, by covering it, with the front surface 35.

With reference to the particular embodiment shown in the figures, also the upper lateral surface 31 and the lower lateral surface 32 are covered by corresponding covering sheet-shaped elements 37.

Alternative embodiments cannot however be ruled out in which the sheet-shaped elements 37 are associated, besides to the upper lateral surface 31 and to the lower lateral surface 32, also to the two vertical lateral surfaces 34, 35.

Figure 6:
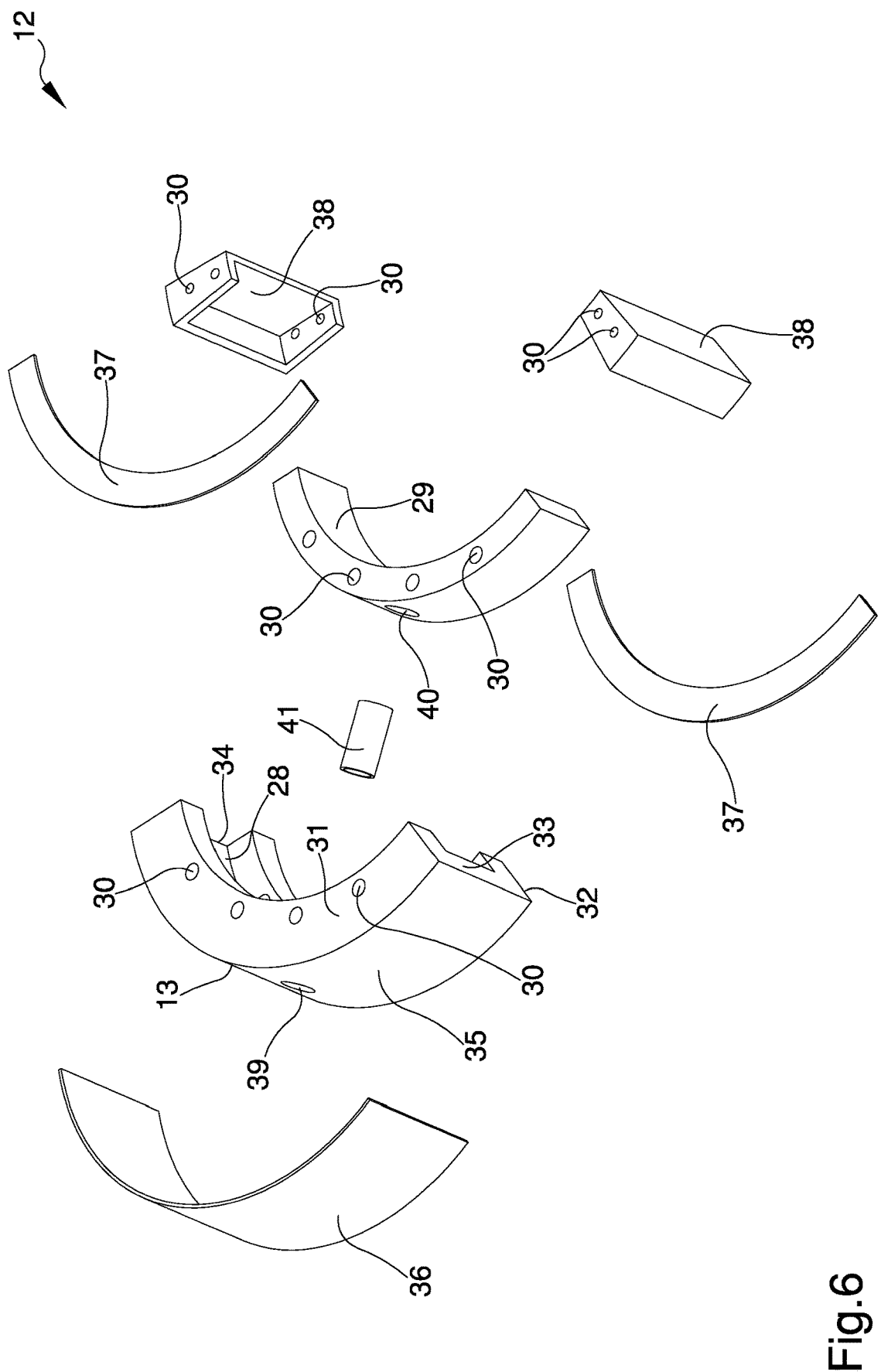
FIG. 6 is an exploded view of a detail of FIG. 5.

On the contrary, as shown in FIG. 6, the two vertical lateral surfaces 34, 35 are covered by corresponding cap elements 38.

According to a preferred embodiment, the cap elements 38 are made of a polymeric material.

Preferably, the cap elements 38 are made of polyzene.

Advantageously, the cap elements 38 are associated with the vertical lateral surfaces 34, 35 by interposition of connecting elements of the type, e.g., of screws. In other words, the cap elements 38 abut against the upper lateral surface 31 and the lower lateral surface 32 by clamping the same in a sandwich-like fashion.

The support element 13 and the anchoring element 29 comprise a central hole 39, 40 respectively which is adapted to place the interior of the shaft element 9 in communication with the covering element 36.

Specifically, the central holes 39, 40 in the assembly configuration are coincident to one another.

In contrast to the auger element 8, 9 which is electrically insulated, the anodic elements 12 are electrified, and the central holes 39, 40 are adapted to allow the connection of each anodic element 12 to power supply means 23 described in detail in the following of the present discussion.

The central hole 39 of the support element 13 is associated with a passage duct 41 which, in the assembly configuration, can be fitted to size inside the central hole 40 of the anchoring element 29 and is adapted to allow the passage of the power supply means 23.

Specifically, the covering element 36 is connected to the power supply means 23; this means that the covering element 36 is electrified in a uniform manner.

Added to this, is the fact that, when present, the covering element 36 and the sheet-shaped elements 37, being associated with the support element 13 adjacent to one another, define a continuous surface which is electrified in a uniform manner.

More in detail, the electrification of each anodic element 12 is due to the fact that the covering element 36 and the sheet-shaped elements 37 are electrified. In other words, the power supply means 23 are connected directly to the covering element 36.

The C conformation of the anodic elements 12 facilitates the assembly and placement thereof inside respective housing spaces 14 defined by the helical element 8.

In this regard, the helical element 8 has a pitch P defining a plurality of housing spaces 14 of the anodic elements 12.

The pitch P of the helical element 8 is decreasing along the direction of advancement D of the sludge to be treated; this facilitates compaction of the solid fraction of the sludge which, during the movement of the helical element 8, loses its liquid fraction. It cannot however be ruled out that the pitch P of the helical element 8 is increasing along the direction of advancement D.

Again, it cannot be ruled out that the pitch P of the helical element 8 is constant along the direction of advancement D.

Each housing space 14 comprises at least one anodic element 12.

In detail, each housing space 14 comprises a plurality of anodic elements 12.

Preferably, each housing space 14 comprises at least two anodic elements 12.

Advantageously, each housing space 14 comprises three anodic elements 12.

It cannot however be ruled out that each housing space 14 comprises four, five, six, etc. anodic elements 12.

With reference to a preferred embodiment shown in the illustrations, the shaft element 9 has three triads of anodic elements 12.

The anodic elements 12 are arranged in succession and staggered from one another; this allows homogeneously applying their potential inside the treatment chamber 4.

Specifically, the anodic elements 12 are staggered from one another by about ⅓ of the pitch P.

Preferably, the anodic elements 12 are associated with the shaft element 9 in the proximity of the second ending part 11.

As can be seen from the figures, the shaft element 9 can be subdivided into a first portion 15 and into a second portion 16 by a median plane A transverse to the resting surface 7.

The first portion 15, arranged upstream of the median plane A with respect to the direction of advancement D, is without the anodic elements 12.

At the same time, the second portion 16, arranged downstream of the median plane A with respect to the direction of advancement D, is provided with the anodic elements 12.

This allows obtaining the separation of the liquid fraction from the solid fraction by simple mechanical separation in the first portion 15, and also obtaining a further electro-osmotic separation in the second portion 16.

The advancement of the sludge to be treated along the direction of advancement D is determined by the motion of the helical element 8 about the relative axis R, while the separation of the liquid fraction from the solid fraction occurs along the first portion 15 by the action of the centrifugal force and the force of gravity, and along the second portion 16 by giving rise to an electro-osmotic process.

Specifically, the electro-osmotic process is obtained by applying a potential difference between the filtration means 17 arranged inside the treatment chamber 4 and the anodic elements 12.

In this regards, the device 1 comprises application means for applying a potential difference between the anodic elements 12 and the aforementioned filtration means 17, and wherein these means for applying a potential difference generate an electric field adapted to interact with the sludge to be treated to produce the electro-osmotic process. In the present case, the application means for applying a potential difference 18, 23 comprise grounding means 18 associated with the filtration means 17 to define a cathode.

The filtration means 17 are then brought to the electric potential of the ground via a connecting circuit, schematically shown in the figures, and of a type known to those skilled in the art.

In other words, the potential difference is established between the anode defined by the anodic elements 12 and the cathode defined by the grounded filtration means 17; this means that the filtration means 17 are not electrified.

It cannot however be ruled out that the filtration means 17 be electrified, i.e. they are associated with a corresponding power supply circuit.

The filtration means 17 comprise a substantially cylindrical metal body, and wherein the auger element 8, 9 is housed inside.

In detail, between the metal body 17 and each anodic element 12 there is a mutual distance comprised between 0.5 cm and 5 cm.

Preferably, the aforementioned mutual distance is comprised between 1 cm and 3 cm. This structural expedient considerably increases the efficiency of separation of the liquid fraction from the solid fraction.

In this regard, it should be noticed that the fact that the anodic elements 12 are associated with the shaft element 9 allows keeping constant the mutual distance of the anodic elements themselves from the cathode, i.e. the metal body 17.

Again, in other words, the cylindrical conformation of the metal body 17 together with the C-shaped configuration of the anodic elements 12 allows keeping constant the mutual distance there between.

The metal body 17 comprises a plurality of V-shaped or trapezoidal tubular elements 19.

The tubular elements 19 have a configuration which is known to those skilled in the art and, in this case, is of the wedge wire type.

Moreover, the device 1 comprises delivery means 20 of a washing liquid of the filtration means 17.

In other words, the delivery means 20 comprise a plurality of delivery nozzles located inside the treatment chamber 4, associated with a power supply hydraulic circuit, not shown in the figures, and adapted to deliver a washing liquid onto the surface of the metal body 17.

The fact of subjecting the sludge to the electric field established between the auger element 8, 9 and the filtration means 17 determines the migration of the colloidal particles of the sludge itself, which particles, being electronegatively charged, migrate towards the anode, i.e. the anodic elements 12.

At the same time, the liquid fraction and the positive ions present in the sludge migrate towards the cathode, i.e. the metal body 17 by passing through the tubular elements 19. In this regard, the device 1 comprises a collection chamber 21 of the liquids extracted from the sludge to be treated which is defined externally to the metal body 17.

The collection chamber 21 comprises an outlet opening 22 of the sludge liquid fraction, obtained in the proximity of the inlet opening 5.

Indeed it is to be noticed that the inclination of the shaft element 9 facilitates collection of the liquid fraction.

Added to this, is the fact that on the liquid fraction the force of gravity and the electric force orthogonal to the anodic elements 12 act in a synergistic manner, and the resulting force of which has a direction opposite to the direction of advancement D, that is to say it faces the discharge opening 6.

Moreover, the application means for applying a potential difference 18, 23 comprise power supply means 23 of the anodic elements 12.

These power supply means 23 comprise a plurality of supply circuits, in which each of them is associated with at least one of the anodic elements 12.

According to a preferred embodiment, the power supply circuits 23 comprise a plurality of electric connection cables 42 adapted to supply the anodic elements 12 independently of one another.

The electric connection cables 42 pass through the shaft element 9 internally and have one ending part associated with the respective anodic elements 12, in this case with the covering element 36, and the other ending part associated, externally to the casing 3, with a power supply unit 43.

More in detail, the electric connection cables 42 are connected to the respective anodic elements 12 by passing through the central holes 39, 40 and the passage duct 41. Furthermore, the power supply unit 43 is of the type of an electric motor.

The power supply circuits 23 comprise a plurality of electric brushes connected to corresponding sliding contact collectors, in turn connected to the electric motor. More in detail, these sliding contact collectors comprise a ring made of copper and locked together with the shaft element 9 in sliding contact on the electric brushes associated with the supporting frame 2 and made at least partly of graphite.

Preferably, the electric brushes are made of carbon.

It cannot however be ruled out that the aforementioned electric brushes are made of an alloy of coal and copper.

It should be noticed that the fact that each anodic element 12 is associated with a respective power supply circuit 23 makes it possible to supply the anodic elements themselves independently of one another, thus varying the corresponding potential values at which they are supplied.

In detail, each anodic element 12 is supplied at a predefined potential value and different to that of the other anodic elements 12.

The potential value mentioned above at which each anodic element 12 is supplied, may be an increasing or decreasing value along the direction of advancement D.

More in detail, this potential value defines a gradient; this means that the spatial distribution of the value of the field along the direction of advancement D is increasing or decreasing depending on the potential values applied to the anodic elements 12.

At the same time, the field mentioned above is in first approximation constant along the radial direction starting from each anodic element 12.

Specifically, with reference to a preferred embodiment, the anodic elements 12 housed in one of the housing spaces 14 are supplied at a potential value equal to one another and different to the respective potential value at which are supplied the anodic elements 12 which are housed in the other corresponding housing spaces 14.

In other words, each power supply circuit 23 is associated with a plurality of anodic elements 12 defining a group supplied with the same potential value.

For example, as shown in the figures, each triad of anodic elements 12 is associated with a respective power supply circuit adapted to apply a predefined potential value and different to that of the other triads of anodic elements 12.

It cannot however be ruled out that a single power supply circuit 23 is associated with groups comprising two, four, five etc. anodic elements 12.

In this way, each group of anodic elements 12, in this case each triad of anodic elements 12, defines a corresponding portion inside the treatment chamber 4 having a predefined potential value.

With reference to the particular embodiment illustrated in the figures, the shaft element 9 has associated three triads of anodic elements 12 defining three corresponding internal portions having different potential values.

It is easy to appreciate that in the case in which each single power supply circuit being associated with a single anodic element 12, each of them defines a respective internal portion.

In fact, the anodic elements 12 supplied at potential values different to each other define respective portions inside the treatment chamber 4 which are adapted to make a potential difference with the filtration means 17 which is increasing along the direction of advancement D.

In other words, the fact that the electric field has a gradient which increases along the direction of advancement D proportionate to the dryness degree of the sludge to be treated, allows a considerable improvement in the separation efficiency. In fact, the sludge to be treated, when dehydrating along the direction of advancement D, increases the electric resistance thus requiring greater values of potential difference in order to keep the separation efficiency unchanged over time.

It cannot however be ruled out that the anodic elements 12 are supplied at potential values different to each other, that mutually define portions inside the treatment chamber 4 which are adapted to achieve a potential difference with the filtration means 17, which is decreasing along the direction of advancement D.

Furthermore, it cannot be ruled out that the anodic elements 12 are supplied at potential values having alternating maximums and minima, and defining portions inside the treatment chamber 4, which portions have in turn potential values alternating with each other.

It should be noticed that the term "internal portion" relates to the space surrounding each anodic element 12 that is supplied at a predefined potential value and substantially delimited by the pitch P of the helical element 8; this means that in the present case, this term relates to the space surrounding each triad of anodic elements 12.

Within each internal portion, maximum process efficiency is achieved in terms of separation yield and energy consumption.

In addition, the device 1 comprises thermal control means 24 of the temperature inside the treatment chamber 4.

The thermal control means 24 are e.g. of the type of a thermocouple of a type known to those skilled in the art.

The power supply means 23 and thermal control means 24 are controlled by means of a handling and control unit 25.

This handling and control unit 25 is in fact operatively connected to the power supply means 23, the motor means 27 and the thermal control means 24.

More in detail, the handling and control unit 25 is adapted to vary the potential values applied to the anodic elements 12 according to the needs of an operator.

Preferably, the power supply means 23 apply a potential value higher than 10 Volt to the anodic elements 12.

Advantageously, the power supply means 23 apply a potential value comprised between 10 Volt and 50 Volt to the anodic elements 12.

In addition, the handling and control unit 25 is adapted to vary the rotation speed of the shaft element 9 according to specific speed values preset by the operator and variable depending on the retention time of the sludge to be treated which is to be obtained.

Again, the handling and control unit 25 is adapted to monitor the flow rate of the sludge to be treated which enters the treatment chamber 4.

This flow rate is, in fact, pre-settable by the operator according to predefined values. Again, the handling and control unit 25 is adapted to interrupt and/or activate the power supply of the anodic elements 12 according to the temperature values detected by the thermal control means 24.

In this regard, at temperature values equal to or higher than 50° C., the handling and control unit 25 interrupts the power supply of the anodic elements 12. Conversely, with temperature values equal to or less than 35° C., the handling and control unit 25 activates the power supply of the anodic elements 12. This is aimed at counteracting the Joule effect due the electric field being applied inside the treatment chamber 4.

In addition, the device 1 comprises pressure regulating means, not shown in detail in the figures, and adapted to maintain the treatment chamber 4 at a predefined pressure value.

In order to achieve optimum regulation of the pressure inside the treatment chamber 4, the device 1 comprises venting means 26 of the gases produced during the movement of the sludge to be treated along the treatment chamber 4, i.e. during its forward movement along the direction of advancement D.

In addition, it cannot be ruled out that the device 1 comprises introducing means of an electrolytic liquid which are arranged inside the treatment chamber 4 in the proximity of the inlet opening 5.

Prior to describing in detail how the present invention as well as the specific structural aspects thereof work, it should be noticed that the fact of making portions having different potential values inside the treatment chamber 4, allows considerably increasing the separation efficiency.

To this it is added that the fact of having an electrically insulated shaft and provided with electrified anodic elements 12 with different potential values allows obtaining completely different effects with respect to those described in patent documents EP2585778, U.S. Pat. No. 5,403,455, US2012/255872, U.S. Pat. No. 4,323,445 and WO2008/029961.

In fact, the technical effect due to the presence of internal portions having different potential values allows modifying the potential of each internal portion depending on the type of sludge to be treated.

The operation of the present invention is as follows.

The sludge to be treated enters the treatment chamber 4 through the inlet opening 5 and is moved along the direction of advancement D by the auger element 8, 9.

It should be pointed out that the sludge to be treated enters the treatment chamber 4 with a predetermined flow rate value and set through the handling and control unit 25. The sludge to be treated entering the treatment chamber 4 comprises the dry fraction present in a concentration by weight ranging from 2% to 5%.

The auger element 8, 9, operated in rotation by the motor means 27, drags the sludge to be treated along the first portion 15.

In this phase, the separation of the liquid fraction from the solid fraction takes place by mechanical action in combination with the centrifugal and gravity force.

During the movement of the sludge to be treated along the first portion 15, the liquid fraction is separated from the dry fraction due to the mechanical force generated by the rotation of the helical element 8 and of the shaft element 9.

A first part of the liquid fraction extracted from the sludge to be treated passes through the tubular elements 19 of the wedge wire type and is collected inside the respective collection chamber 21.

At this point, the sludge to be treated comprises the dry fraction present in a concentration by weight ranging from 8% to 12%.

The remaining sludge to be treated, deprived of the first part of liquid fraction, continues its forward movement, along the direction of advancement D, passing through the second portion 16 where it is subjected to the electric field generated by the potential difference established between the anodic elements 12 and the filtration means 17, in this case the tubular elements 19.

In detail, the sludge to be treated is subjected to different potential difference values according to the internal portions in which it is made to move forward.

In other words, during its advancement, the sludge to be treated passes through the internal portions defined by the corresponding triads of anodic elements 12 housed inside the housing spaces 14, and supplied by the corresponding power supply circuits 23.

Once it has arrived near the second ending part 11, the treated sludge escapes from the treatment chamber 4 through the discharge opening 6.

The treated sludge coming out of the treatment chamber 4 at the end of its advancement along the second portion 16 comprises the dry fraction present in a concentration by weight of more than 20%.

Preferably, the treated sludge comprises the dry fraction present in a concentration by weight ranging from 22% to 35%. At the same time, the liquid fraction, passing through the tubular elements 19 and collected inside the collection chamber 21, protrudes outwards through the outlet opening 22.

In the case of the temperature values detected by the thermal control means 24 being higher than 50° C., the handling and control unit 25 interrupts the power supply to the anodic elements 12 and resumes it only in the event of the lowering of the detected temperature.

It has in practice been found that the described invention achieves the intended objects. It is emphasized that the particular measure of providing a plurality of anodic elements supplied at different potential values, allows obtaining an electro-osmotic process having different potential values inside the treatment chamber. Added to this is the fact that the synergistic combination between the presence of zero potential filtration means and anodic elements associated with the shaft element on predefined portions of the latter, and in turn electrically insulated, allows obtaining a treatment chamber in which the sludge to be treated is separated, along the first portion, by simple mechanical action of centrifugal and gravity force, and along the second portion by effect of an electric field having different potential values. It should be noticed that the presence of portions inside the treatment chamber having variable potential values along the direction of advancement of the sludge to be treated, considerably increases the separation efficiency of the sludge itself compared to known devices.

Again, the provision of an electrically insulated auger element together with anodic elements associated therewith, but independent of the latter, allows considerably reducing the deposition of sludge residues on the auger element itself.

Indeed, the fact of providing a single movement element consisting in the auger element which is separate from the anodic elements, allows considerably reducing the wear thereof.

The invention claimed is:

1. A device for sludge treatment, the device comprising:
   a treatment chamber provided with:
   an opening for a sludge to be treated;
   a discharge opening for a treated sludge;
   at least one auger element housed within said treatment chamber, and adapted to move the sludge to be treated along a direction of advancement; and
   filtration means located internally to said treatment chamber and surrounding said at least one auger element, said filtration means comprise at least one substantially cylindrical metal body;
   wherein the device comprises at least one anodic element associated with said at least one auger element, and application means configured or adapted to apply a potential difference between said at least one anodic element and said filtration means, configured or adapted to generate an electric field adapted to interact with said sludge to be treated to produce an electro-osmotic process,
   wherein the device comprises a plurality of anodic elements associated with said at least one augar element, and wherein said plurality of anodic elements includes said at least one anodic element, and
   wherein said plurality of anodic elements are substantially C shaped.

2. The device according to claim 1, wherein said application means configured or adapted to apply a potential difference comprise grounding means associated with said filtration means to define a cathode.

3. The device according to claim 1, wherein said at least one auger element comprises at least one helical element locked together with a motorized shaft element and operable in rotation around a relative axis, said plurality of anodic elements being associated with said shaft element.

4. The device according to claim 3, wherein said at least one helical element has a pitch defining a plurality of housing spaces of said plurality of anodic elements.

5. The device according to claim 4, wherein each of said housing spaces comprises said at least one anodic element.

6. The device according to claim 3, wherein said at least one helical element and said shaft element are coaxial to one another, said shaft element being provided with a first ending part located in the proximity of said opening for sludge to be treated, and with a second ending part located in the proximity of said at least one discharge opening for a treated sludge, and wherein said plurality of anodic elements, which are associated with said shaft element, are located in the proximity of said at least one discharge opening.

7. The device according to claim 3, wherein said shaft element is electrically insulated and covered at least partly with an electrical insulation resin.

8. The device according to claim 3, wherein said axis is substantially transverse with respect to a horizontal resting surface of said treatment chamber.

9. The device according to claim 1, wherein said filtration means and said plurality of anodic elements have a mutual distance within the range of 0.5 cm to 5 cm.

10. The device according to claim 1, wherein said filtration means and said plurality of anodic elements have a mutual distance between the range of 1 cm and 3 cm.

11. The device according to claim 1, wherein said metal body comprises a plurality of V-shaped or trapezoidal tubular elements.

12. The device according to claim 1, wherein the device comprises a collection chamber for liquids extracted from said sludge to be treated, wherein the collection chamber is disposed externally to said metal body.

13. A device for sludge treatment, the device comprising:
a treatment chamber provided with:
   an opening for a sludge to be treated;
   a discharge opening for a treated sludge;
   at least one auger element housed within said treatment chamber, and adapted to move the sludge to be treated along a direction of advancement; and
   filtration means located internally to said treatment chamber and surrounding said at least one auger element, said filtration means comprise at least one substantially cylindrical metal body;
wherein the device comprises at least one anodic element associated with said at least one auger element, and application means configured or adapted to apply a potential difference between said at least one anodic element and said filtration means, configured or adapted to generate an electric field adapted to interact with said sludge to be treated to produce an electro-osmotic process,
wherein the device comprises a plurality of anodic elements associated with said at least one augar element, and wherein said plurality of anodic elements includes said at least one anodic element,
wherein said application means configured or adapted to apply a potential difference comprise power supply means of said plurality of anodic elements, and
wherein said each of anodic elements comprise afront surface and four lateral surfaces, said four lateral surfaces are parallel and opposed to each other in sets or pairs of twos, and at least one covering element made of an electricity conductive material, associated with said front surface and connected to said power supply means.

14. The device according to claim 13, wherein said plurality of anodic elements comprise at least two sheet-shaped elements made of an electricity conductive material and associated, with at least two of said lateral surfaces in order to cover said at least two lateral surfaces.

* * * * *